US006768092B2

United States Patent
Sakata (10) Patent No.: US 6,768,092 B2
(45) Date of Patent: Jul. 27, 2004

(54) SENSOR IN CAR WINDOW (75) Inventor: Kazuki Sakata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 215 days.

(21) Appl. No.: 10/002,200

(22) Filed: Dec. 5, 2001

(65) Prior Publication Data

US 2003/0010890 A1 Jan. 16, 2003

(30) Foreign Application Priority Data

Jul. 13, 2001 (JP) ........................................ 2001-213348

(51) Int. Cl.$^7$ .............................. G02B 3/00; G02B 5/04
(52) U.S. Cl. .............................. 250/208.1; 250/227.25; 359/809
(58) Field of Search ........................ 250/208.1, 227.25; 359/809

(56) References Cited

U.S. PATENT DOCUMENTS

| 1,080,208 A | * | 12/1913 | David | 359/809 |
| 1,637,309 A | * | 7/1927 | David | 359/809 |
| 2,109,932 A | * | 3/1938 | Schneider | 359/809 |
| 4,286,846 A | * | 9/1981 | Bollenbacher | 359/809 |

FOREIGN PATENT DOCUMENTS

JP    4-194827    7/1992

* cited by examiner

Primary Examiner—Stephone B. Allen
(74) Attorney, Agent, or Firm—Sughrue Mion, PLLC (57) ABSTRACT

A sensor in a car window permits a reduction in size thereof. The sensor includes a lens that is provided on the inner side of a sloping windshield to condense light coming from an object to be detected that is located outside the windshield, a sensor main body that detects the object to be detected by means of the light that has passed through the lens, and a transparent glass pane that is provided between the windshield and the lens to refract the light from the object to be detected that has passed through the windshield.

16 Claims, 7 Drawing Sheets

SENSOR IN CAR WINDOW

BACKGROUND OF THE INVENTION

1. Field of the Invention

The present invention relates to a sensor in a car window that is installed in a car window to detect an object to be detected that is located outside a car.

2. Description of the Related Art

Figure 6:
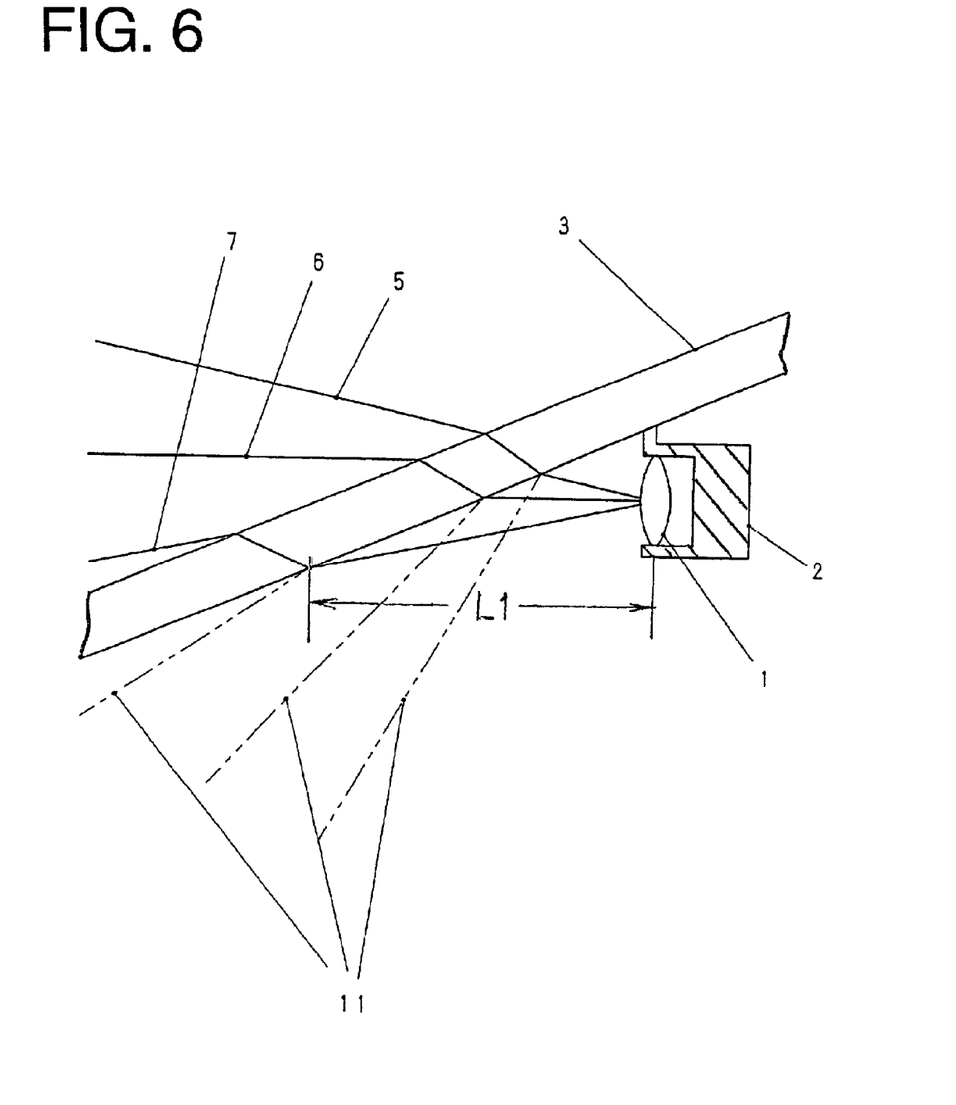
FIG. 6 is a sectional side elevation of a conventional camera in a car window.

FIG. 6 is a sectional view of a camera in a car window that represents a conventional sensor in a car window.

The camera in the car window includes a lens 1 provided on the inner surface of a windshield 3 (a windowpane), and a camera main body 2 serving as a sensor main body that detects, through the lens 1, an object to be detected (not shown) that is located outside the windshield 3.

In the camera in a car window, an upper incident ray 5, a middle incident ray 6, and a lower incident ray 7 from the object to be detected enter the lens 1 through the windshield 3, and the camera main body 2 photographs the object to be detected.

The camera in the car window, however, has been posing a problem in that a maximum optical path length L1 of the rays that directly enter the lens 1 through the windshield 3 is long. Reference character L1 in this case denotes the horizontal distance between the point at which the lower incident ray 7 exits from the inner surface of the windshield 3 and the center line of the lens 1.

Furthermore, when the rays enter the lens 1 through the windshield 3, ghost rays 11 reflected off of a dashboard or the like reflect on the windshield 3 and reach the lens 1 along the same optical path taken by the upper incident ray 5, the middle incident ray 6, and the lower incident ray 7, thus forming an image on the dashboard or the like. This has been presenting a problem in that the image formed on the dashboard is undesirably superimposed on the image of the object to be detected, leading to deteriorated quality of the photographed image.

Figure 7:
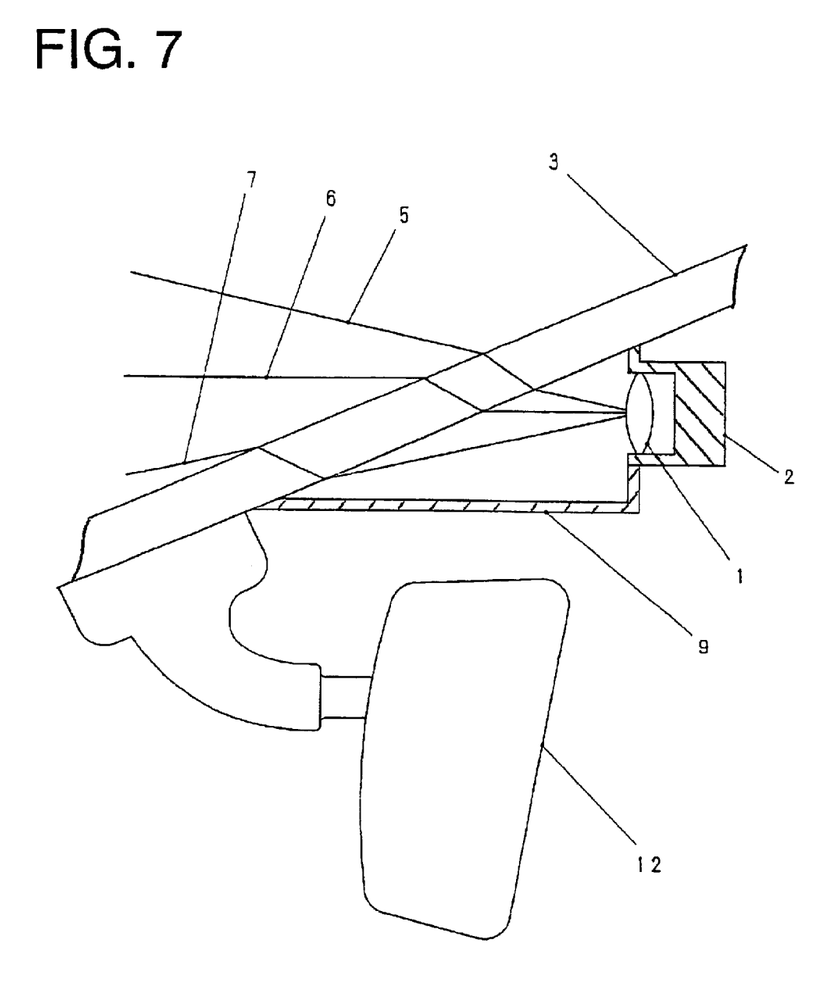
FIG. 7 is a sectional side elevation showing another example of the conventional camera in a car window.

To solve the problem, there has been adopted a means for covering the area between the camera main body 2 and the windshield 3 by a hood 9 shown in FIG. 7 thereby to block the ghost rays 11 reflected off of a dashboard or the like, as disclosed in, for example, Japanese Unexamined Patent Publication No. 4-194827.

In recent years, however, there has been a trend toward increasing the angle of inclination of the windshield 3 to reduce air resistance. The trend has inevitably resulted in an increase in the optical path distance L1 with a consequent increase in the size of the hood 9. This has given a rise to a problem in that the visual field of occupants is interfered with, and a camera in a car window cannot be installed at a proper position free of the interference by a rearview mirror 12.

SUMMARY OF THE INVENTION

The present invention has been made with a view toward solving the problem described above, and it is an object of the invention to provide a sensor in a car window, the sensor primarily featuring a reduced maximum optical path distance from a windowpane to a lens so as to permit a reduction in the size thereof.

To this end, according to the present invention, there is provided a sensor in a car window, the sensor having a lens that is provided on the inner side of a sloping windowpane to condense light coming from an object to be detected that is located outside the windowpane, a sensor main body that detects the object to be detected by means of the light that has passed through the lens, and a transparent member that is provided between the windowpane and the lens to refract the light from the object to be detected that has passed through the windowpane.

DESCRIPTION OF THE PREFERRED EMBODIMENTS

In the following descriptions of a camera in a car window, which represents the sensor in the car window in accordance with the present invention, the members or portions that are the same as or corresponding to those of the conventional camera in a car window will be assigned the same reference numerals.

First Embodiment

Figure 1:
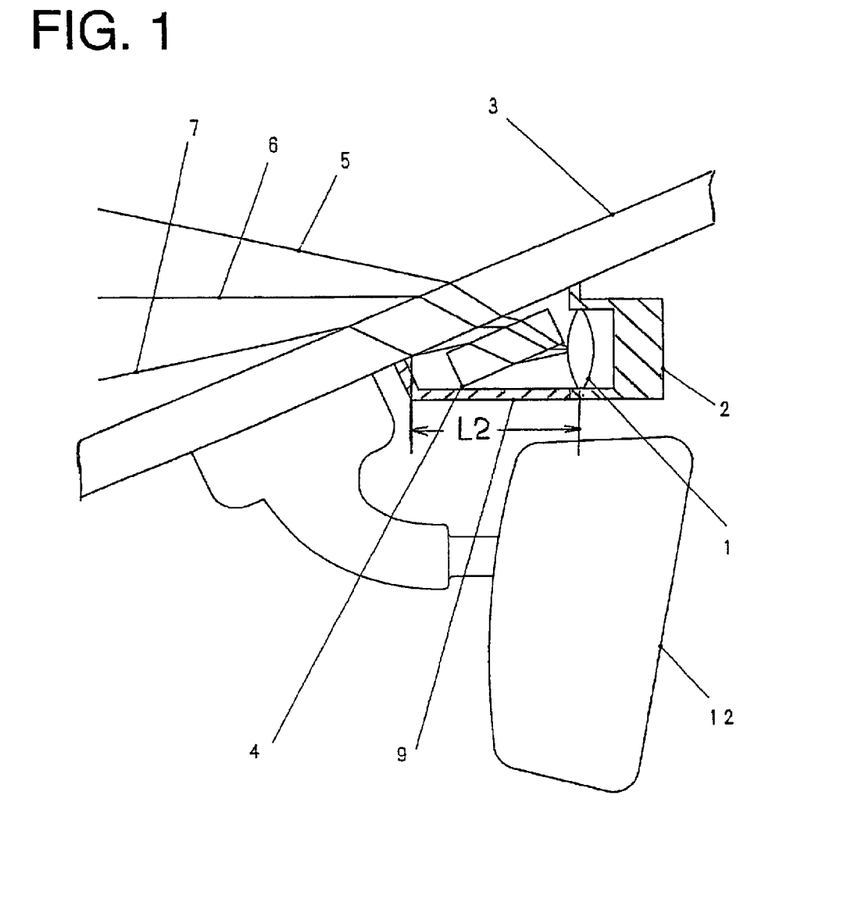
FIG. 1 is a sectional side elevation of a camera in a car window according to a first embodiment of the present invention.

FIG. 1 is a sectional side elevation of a camera in a car window according to a first embodiment. The camera includes a lens 1 provided on the inner side of a windshield 3, which is a sloping windowpane, a camera main body 2 acting as a sensor main body for detecting, through the lens 1, an object to be detected (not shown) that is located outside the windshield 3, a transparent glass pane 4, which is a transparent member provided between the windshield 3 and the lens 1 to refract the light coming from the object to be detected that has passed through the windshield 3, and a hood 9 that covers the area between the windshield 3 and the lens 1. The transparent glass pane 4 is disposed in parallel to the windshield 3.

In the camera in the car window, an upper incident ray 5, a middle incident ray 6, and a lower incident ray 7 from the object to be detected enter the lens 1 through the windshield 3 and the transparent glass pane 4, and the camera main body 2 photographs the object to be detected.

In the camera according to the first embodiment, the upper incident ray 5, the middle incident ray 6, and the lower incident ray 7 reach the lens 1 through the windshield 3 and the transparent glass pane 4. These rays are shifted downward in the middle of the optical path thereof, as compared with the conventional camera, because of the refractive index of the transparent glass pane 4 that is larger than that of air. Hence, if the position where the camera main body 2 is installed in relation to the windshield 3 remains unchanged, then the upper incident ray 5, the middle incident ray 6, and the lower incident ray 7 are shifted upward when they are incident upon the lens 1, as compared with the conventional camera. This reduces a maximum optical path length L2 from the windshield 3 to the lens 1 (L2: the horizontal distance from the point where the lower incident ray 7 leaves the inner surface of the windshield 3 to the center line of the lens 1). Hence, it is possible to reduce the length of the hood 9 that covers the area from the camera main body 2 to the windshield 3 so as to block the ghost rays 11 reflected off of the dashboard or the like.

The hood 9 protects the lens 1 from contamination attributed to dust or cigarette smoke particles floating in the air in the vehicle compartment.

The transparent glass pane 4 is disposed in parallel to the windshield 3. In other words, the transparent glass pane 4 is disposed along the windshield 3 so as to allow the transparent glass pane 4 to be installed without the need for increasing the size of the hood 9.

Second Embodiment

Figure 2:
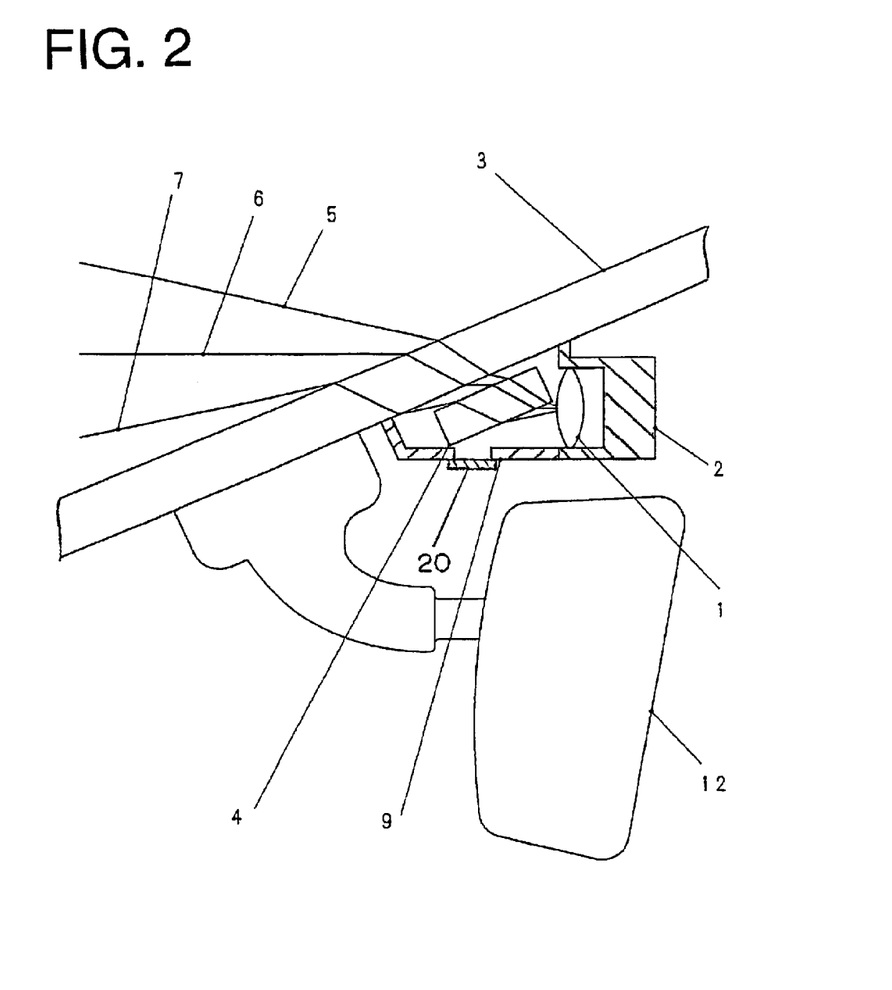
FIG. 2 is a sectional side elevation of a camera in a car window according to a second embodiment of the present invention.

FIG. 2 is a sectional side elevation of a camera in a car window according to a second embodiment. The second embodiment differs from the first embodiment in that a hood 9 is provided with a breathable dustproof filter 20.

In the camera in a car window that has the construction described above, the breathable dustproof filter 20 is detachably installed on the hood 9, so that air is free to move into and out of the hood 9, making it possible to maintain the temperature and humidity inside and outside the hood 9 approximately at the same levels.

Accordingly, dew may be gathered on the surface of a lens 1 in the hood 9 as well as a windshield 3 under a dewy condition in a vehicle compartment; however, the arrangement described above will prevent dew from forming only on the surface of the lens 1 in the hood 9 and the inner surface of the windshield 3 when temperature changes inside or outside the hood 9. If the dew on the surface of the lens 1 must be quickly removed, the breathable dustproof filter 20 may be removed to manually wipe the dew off with cloth or the like.

Furthermore, when the air in the vehicle compartment that contains particulates, such as cigarette smoke particulates, flows into the hood 9, the particulates or the like are collected by the breathable dustproof filter 20, thereby protecting the surface of the lens 1 in the hood 9 and the inner surface of the windshield 3 from contamination.

Thus, the camera in the car window makes it possible to photograph an object to be imaged, i.e., an object to be detected, without the danger of dew forming only on the surface of the lens 1 in the hood 9 and on a part of the windshield 3 (a part of the windshield 3 covered by the hood 9), and without the danger of the surface of the lens 1 in the hood 9 and a part of the windshield 3 being affected by contamination in the vehicle compartment.

Third Embodiment

Figure 3:
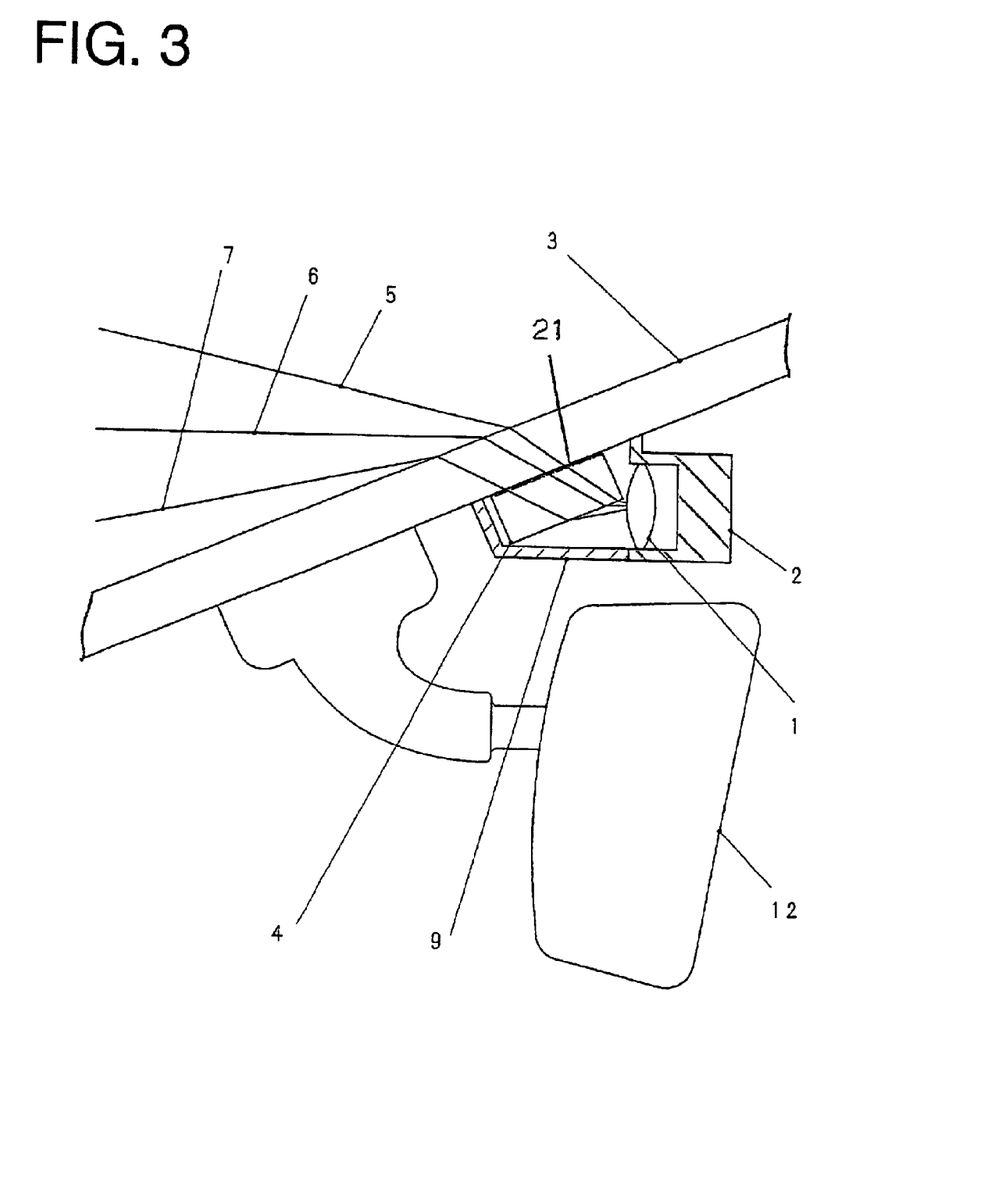
FIG. 3 is a sectional side elevation of a camera in a car window according to a third embodiment of the present invention.

FIG. 3 is a sectional side elevation of a camera in a car window according to a third embodiment. The third embodiment differs from the first embodiment in that a transparent glass pane 4 is attached to a windshield 3 by a light-transmitting adhesive agent 21.

In this embodiment, no air layer lies between the windshield 3 and the transparent glass pane 4; therefore, light enters the transparent glass pane 4 without reflecting. Moreover, the surface of transparent glass pane 4 that faces the windshield 3 will be free of dust, droplets, etc., thus allowing quality images to be obtained.

Fourth Embodiment

Figure 4:
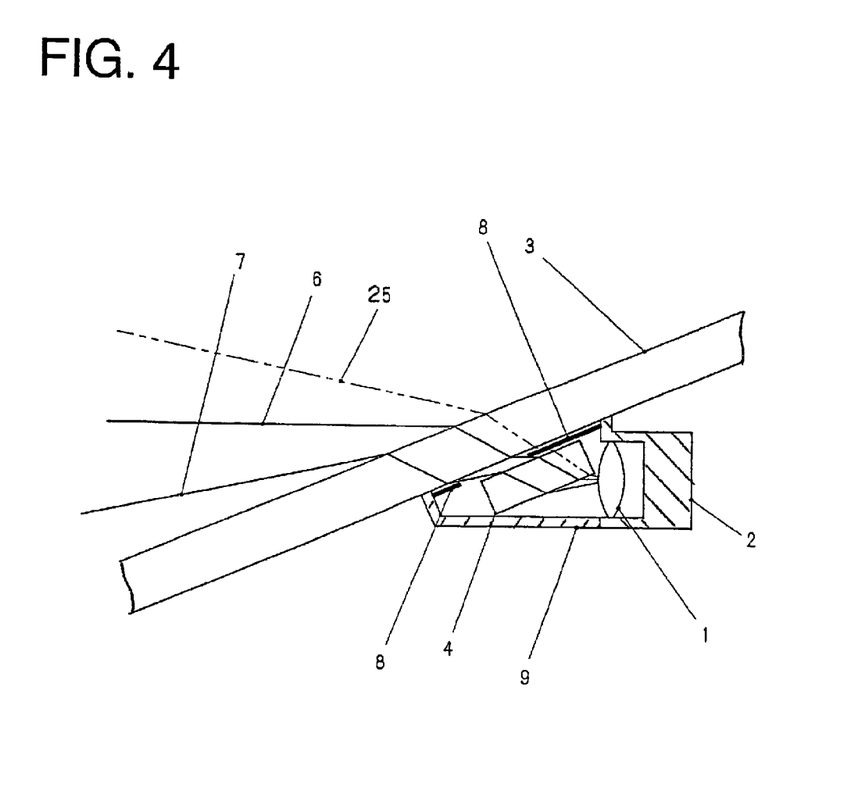
FIG. 4 is a sectional side elevation of a camera in a car window according to a fourth embodiment of the present invention.

FIG. 4 is a sectional side elevation of a camera in a car window according to a fourth embodiment. The fourth embodiment differs from the first embodiment in that a light-shielding member 8 is provided between a windshield 3 and a lens 1. The light-shielding member 8 blocks unwanted light other than the light from an object to be detected.

In this embodiment, an unwanted incident ray 25, which is an unwanted ray, such as a direct sunlight beam, is blocked by the light-shielding member 8, thus making it possible to obtain quality images free of ghost or flare.

Fifth Embodiment

Figure 5:
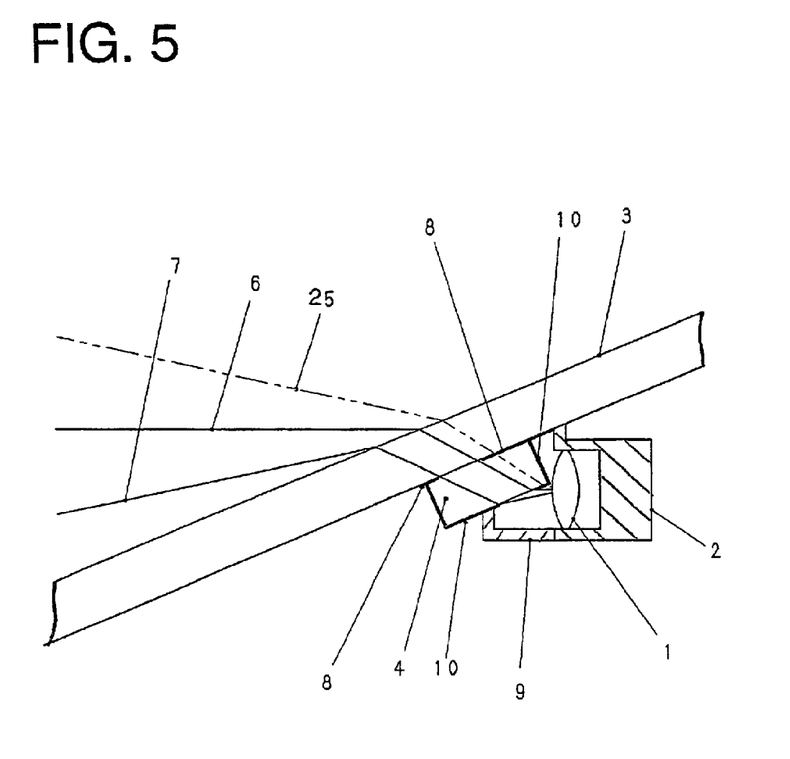
FIG. 5 is a sectional side elevation of a camera in a car window according to a fifth embodiment of the present invention.

FIG. 5 is a sectional side elevation of a camera in a car window according to a fifth embodiment. The fifth embodiment differs from the third embodiment in that a part of a transparent glass pane 4 and a part of a windshield 3 are provided with light shielding/absorbing means for blocking or absorbing unwanted light rays, and also a hood 9 is provided between the transparent glass pane 4 and a lens 1. The light shielding/absorbing means is subjected to sand-floating surface treatment, then coated with Japanese ink 10.

According to the fifth embodiment, an unwanted incident ray 25, such as a direct sunlight beam, is blocked by the Japanese ink 10, thus making it possible to acquire quality images free of ghost or flare.

In the above embodiments, the descriptions have been given of the sensor in a car window for detecting an object to be detected that is located in front of a windshield. The sensor in a car window, however, may alternatively detect an object located, for example, behind a rear windowpane.

Furthermore, in the above embodiments, the descriptions have been given of the camera main body as the sensor main body; it is obvious, however, that the present invention is not limited thereto. For instance, a laser radar may be used as the sensor, and the images taken in by a laser radar main body may be electrically processed thereby to detect the distance to an object, which is an object to be detected outside a car, or to detect the presence of an obstacle, which is an object to be detected.

As described above, a sensor in a car window according to one aspect of the present invention comprises: a lens that is provided on the inner side of a sloping windowpane to condense light coming from an object to be detected that is located outside the windowpane; a sensor main body that detects the object to be detected by means of the light that has passed through the lens; and a transparent member that is provided between the windowpane and the lens to refract the light from the object to be detected that has passed through the windowpane. Therefore, the horizontal distance between the point at which light from an object to be detected exits from the inner surface of a windowpane and the center line of a lens can be reduced, allowing the sensor in a car window to be made smaller.

In a preferred form of the sensor in a car window according to the present invention, the area between the windowpane and the lens is covered by a hood for blocking unwanted light coming from other than an object to be detected. It is possible, therefore, to prevent ghost rays reflected off of a dashboard or the like from entering the windowpane or the transparent member.

In another preferred form of the sensor in a car window according to the present invention, the transparent member is disposed in parallel to the windowpane. This allows the transparent member to be disposed between the windowpane and the lens without the need for increasing the size of the hood.

In a yet another preferred form of the sensor in a car window according to the present invention, a light-shielding member for blocking unwanted light coming from other than an object to be detected is provided between the windowpane and the lens. Hence, the light-shielding member blocks unwanted light rays, such as direct sunlight rays, thereby making it possible to obtain quality images free of ghost or flare.

In a further preferred form of the sensor in a car window according to the present invention, the transparent member is attached to the windowpane by a light transmitting adhesive agent. Hence, no air layer lies between the windowpane and the transparent member, so that light enters the transparent member without reflecting. Moreover, the surface of transparent member that faces the windowpane will remain free of dust, droplets, etc. Thus, quality images can be obtained.

In another preferred form of the sensor in a car window according to the present invention, the transparent member is provided with a light shielding/absorbing means for blocking or absorbing unwanted light coming from other than an object to be detected. Hence, the light shielding/absorbing means blocks or absorbs unwanted light rays, e.g., direct sunlight rays, thereby making it possible to obtain quality images free of ghost or flare.

In a further preferred form of the sensor in a car window according to the present invention, the light shielding/absorbing means is Japanese ink. Hence, unwanted light rays can be easily blocked or absorbed at low cost, and quality images free of ghost or flare can be obtained.

In a further preferred form of the sensor in a car window according to the present invention, the hood is provided with a breathable dustproof filter. This prevents dew from forming only on the surface of the lens in the hood and on a part of the windowpane covered by the hood in the sensor in a car window. Moreover, an object to be detected can be photographed without the danger of the surface of the lens in the hood and a part of the windowpane being adversely affected by contamination in a vehicle compartment.

In another preferred form of the sensor in a car window according to the present invention, the transparent member is a transparent glass pane. It is possible, therefore, to acquire the transparent member at low cost.

In another preferred form of the sensor in a car window according to the present invention, the sensor main body is formed of a camera main body. It is possible, therefore, to photograph an object to be photographed that is located outside a car window.

What is claimed is:

1. A sensor in a car window, comprising:
    a camera lens that is provided on an inner side of a sloping windowpane to condense light coming from an object to be detected that is located outside the windowpane;
    a sensor main body that detects the object to be detected by means of the light that has passed through the lens; and
    a transparent member that is provided between the windowpane and the lens to refract the light from the object to be detected that has passed through the windowpane.

2. A sensor in a car window according to claim 1, wherein the transparent member is disposed in parallel to the windowpane.

3. A sensor in a car window according to claim 1, wherein a light-shielding member for blocking unwanted light coming from other than an object to be detected is provided between the windowpane and the lens.

4. A sensor in a car window according to claim 1, wherein the transparent member is attached to the windowpane by a light transmitting adhesive agent.

5. A sensor in a car window according to claim 1, wherein the transparent member is a transparent glass pane.

6. A sensor in a car window according to claim 1, wherein the sensor main body is formed of a camera main body.

7. A sensor in a car window according to claim 1, wherein the sensor main body is operable to detect light rays projected from the object which are parallel to a traveling direction of the car.

8. A sensor in a car window according to claim 1, wherein the lens is configured such that the lens receives light rays which are shifted upward from the windowpane.

9. A sensor in a car window according to claim 1, wherein the lens is configured such that after the light passes through the windowpane, the light's maximum optical path is reduced by the transparent member.

10. A sensor in a car window according to claim 1, wherein the area between the windowpane and the lens is covered by a hood for blocking unwanted light coming from other than an object to be detected.

11. A sensor in a car window according to claim 10, wherein the hood is provided with a breathable dustproof filter.

12. A sensor in a car window according to claim 1, wherein the transparent member is provided with a light shielding/absorbing means for blocking or absorbing unwanted light coming from other than an object to be detected.

13. A sensor in a car window according to claim 12, wherein the light shielding/absorbing means is ink.

14. A sensor in a car window, comprising:
    a lens that is provided on an inner side of a sloping windowpane to condense light coming from an object to be detected that is located outside the windowpane;
    a sensor main body that detects the object to be detected by means of the light that has passed through the lens; and
    a transparent member that is provided between the windowpane and the lens to refract the light from the object to be detected that has passed through the windowpane,
    wherein the transparent member is provided with a light shielding/absorbing means for blocking or absorbing unwanted light coming from other than an object to be detected.

15. A sensor in a car window according to claim 14, wherein the light shielding/absorbing means is ink.

16. A sensor in a car window, comprising:
    a lens that is provided on an inner side of a sloping windowpane to condense light comprising from an object to be detected that is located outside the windowpane;
    a sensor main body that detects the object to be detected by means of the light that has passed through the lens; and
    a transparent member that is provided between the windowpane and the lens to refract the light from the object to be detected that has passed through the windowpane,
    wherein the area between the windowpane and the lens is covered by a hood for blocking unwanted light coming from other than an object to be detected, and
    wherein the hood is provided with a breathable dustproof filter.

* * * * *